United States Patent [19]
Frisque

[11] 3,856,088
[45] Dec. 24, 1974

[54] METHOD OF EXTINGUISHING OIL AND GAS WELL FIRES

[75] Inventor: Alvin J. Frisque, La Grange, Ill.

[73] Assignee: Nalco Chemical Company, Oak Brook, Ill.

[22] Filed: Dec. 29, 1971

[21] Appl. No.: 213,843

[52] U.S. Cl............ 169/46, 169/69, 166/294, 166/295, 252/2, 252/315, 252/316
[51] Int. Cl............ A62c 3/04, A62c 1/20
[58] Field of Search............ 252/2, 315, 316; 260/29.6 RW, 29.6 H, 29.6 WB; 169/2, 46, 69; 166/294, 295

[56] References Cited
UNITED STATES PATENTS
3,684,707   8/1972   Livingston ............................. 252/2

*Primary Examiner*—William J. Van Balen
*Assistant Examiner*—William R. Dixon, Jr.
*Attorney, Agent, or Firm*—John G. Premo; James F. Lambe

[57] ABSTRACT

Oil and gas fires may be extinguished by injecting into such wells below the fire a stable liquid dispersion of a water soluble anionic vinyl addition polymer and a water soluble cationic polymer, and then inverting this liquid dispersion in the well to produce a three-dimensional water and hydrocarbon liquid insoluble gel-like structure which seals off said well; thereby extinguishing said fires.

6 Claims, No Drawings

METHOD OF EXTINGUISHING OIL AND GAS WELL FIRES

INTRODUCTION

The present invention deals with a novel method of extinguishing oil and gas well fires. Many techniques are used to extinguish these fires. All the methods used rely on either starving the fire, whereby the flame is deprived of air or the oil or gas which fuels such fires are removed from the flame. In attempting to shut wells off to starve the fire from fuel, several methods have been used. One such method that has become popular resides in feeding to the well beneath the surface of the fire a material which will enter the drill hole of the well through the casing and form a solid material which will stop the flow of oil or gas to the surface; thereby extinguishing the fire. This method has frequently utilized such materials as cement or clay-based drilling muds. While these materials have worked to some extent they are difficult to pump and handle and their set time is not easily controlled.

If it were possible to provide a fluid material, which could be readily pumped into a burning oil or gas well and which could be converted into a solid state by simple means, thereby plugging such burning wells, a great advance in the art of fighting fires in oil and gas wells would be provided.

THE INVENTION

In accordance with the invention it has been found that oil and gas well fires may be extinguished by injecting into such wells at a point below the fire a stable liquid dispersion of a water soluble anionic vinyl addition polymer and a water soluble cationic polymer which dispersion comprises:

A. a polymeric latex composed of a water-in-oil emulsion which contains dispersed therein a finely-divided water soluble anionic vinyl addition polymer, said polymeric latex having uniformly distributed therethroughout;

B. a water soluble cationic polymer:

with the weight ratio of (A) to (B) being within the range of 1:10 to 10:1 and the total amount of (A) plus (B) present within said dispersion being within the range of from 5 to 75 percent by weight. The liquid dispersion is then inverted in the well to produce a three-dimensional water and hydrocarbon liquid insoluble gel-like structure which seals off said well; thereby extinguishing said fires. By using this technique it is possible to extinguish oil and gas well fires. The stable liquid dispersions which are more fully described hereinafter may be adjusted with respect to the flowability thereof and can be inverted to produce rigid masses at any point in the well into which they are injected.

THE WATER SOLUBLE ANIONIC VINYL ADDITION POLYMERS

The water soluble anionic vinyl addition polymer is in the form of a water-in-oil emulsion or latex which contains dispersed therein the finely-divided water soluble anionic vinyl addition polymer. This latex contains uniformly distributed therethroughout a water soluble cationic polymer. The water soluble anionic vinyl addition polymers that are used in the practice of the invention may be illustrated by the following list of polymers:

TABLE I

| Number | Name |
|---|---|
| 1 | Polyacrylic acid-sodium salt |
| 2 | Polymethacrylic acid-sodium salt |
| 3 | Maleic anhydride-vinyl acetate copolymer |
| 4 | Polyvinyl methyl ether-maleic anhydride copolymer |
| 5 | Methacrylic acid-acrylamide copolymer |
| 6 | Polyacrylic acid |
| 7 | Isopropenyl acetate-maleic anhydride sodium salt |
| 8 | Itaconic acid-vinyl acetate |
| 9 | Methyl styrene-maleic anhydride sodium salt |
| 10 | Styrene-maleic anhydride |
| 11 | methylmethacrylate-maleic anhydride sodium salt |
| 12 | Acrylic acid-styrene |
| 13 | Acrylamide-acrylic acid (5% by weight) |
| 14 | Acrylamide-acrylic acid (50% by weight) |
| 15 | Polystyrene sulfonic acid |
| 16 | Acrylamide-acrylic acid (80% by weight) |

The above polymers may vary in molecular weight. They may be as low as 10,000 or as high as 12,000,000 or more. In many of the more useful applications, which will be more fully discussed hereafter, the molecular weight will be greater than 1,000,000.

The invention contemplates using as preferred water soluble anionic vinyl addition polymers the homo- and copolymers of acrylic acid as well as the water soluble salts thereof.

THE WATER SOLUBLE CATIONIC POLYMERS

These polymers also may be selected from a wide variety of known polymeric materials. Several of these polymers are listed below in TABLE II

TABLE II

| Number | Name |
|---|---|
| 1 | Ethylene dichloride-ammonia condensation polymers |
| 2 | Tetraethylene pentamine-epichlorohydrin condensation polymers |
| 3 | Epichlorohydrin-ammonia condensation polymers |
| 4 | Polyethylene imine |
| 5 | Ethylene diamine |
| 6 | Polydiallyl amine |
| 7 | Dimethylamino ethyl methacrylate |
| 8 | The methyl chloride quaternary of Number 1 |
| 9 | The benzyl chloride quaternary of Number 7 |
| 10 | Guanidine formaldehyde condensation polymers |
| 11 | Acrylamide-diallylamine (30%) |

The above polymers are illustrative of typical water soluble cationic polymeric materials that may be used in the practices of the invention. A preferred class of these polymers may be described as alkylene polyamines which are illustrated by polymers 1, 2, 3, 4, 5 and 8 above.

Many of the above polymers have been described with respect to the reactants from which they are prepared. A detailed discussion of the above polymers and other cationic polymers appears in Canadian Pat. No. 731,212, the disclosure of which is incorporated herein by reference. The polymers may be employed as solutions or in the form of a water-in-oil latex emulsion. When the polymers are of the vinyl addition type they may be copolymers of other ethylinically saturated monomers. Such copolymers should contain at least 5 percent by weight of the cationic monomer.

THE ANIONIC VINYL ADDITION POLYMER POLYMERIC LATEX

The invention contemplates utilizing the water soluble anionic vinyl addition polymers in the form of water-in-oil emulsion which contains dispersed therein the water soluble anionic vinyl addition polymer. Emulsions of this type are prepared by dispersing the anionic vinyl addition polymer into a water-in-oil emulsion. These polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agitation provided by such devices as stirrers, shakers and the like. To be commercially practical, the amount of polymer in the emulsion should be at least 2 percent by weight. The invention contemplates using emulsions containing between 5 – 75 percent by weight with preferred emulsions having a polymer concentration within the range of 10–45 percent by weight. In some cases the starting emulsions are converted to suspensions due to the nature and the amount of the polymer present therein.

It is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations spray dryers with appropriate size nozzles may be used. It also is possible to prepare the polymercontaining emulsion of the water soluble vinyl addition polymers directly from the vinyl monomers from which these polymers are synthesized. Such polymer-containing emulsions may be synthesized by using the water-in-oil emulsion polymerization technique set forth in U.S. Pat. No. 3,284,393. The teachings of this patent comprise forming a water-in-oil emulsion of water soluble ethylenic unsaturated monomers. The emulsion is formed by utilizing a water-in-oil emulsifying agent. To this monomer is added a free radical-type polymerization catalyst and then heat is applied under free radical-forming conditions to form water soluble polymer latices. The polymeric latices produced by this patent are relatively unstable and frequently must be treated with additional emulsifiers to render the products stable.

The water-in-oil emulsions used to prepare the above polymers may be formulated by any number of known techniques.

The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Company under the Tradename "ISOPAR M." Typical specifications of this narrow-cut isoparaffinic solvent are set forth below in TABLE III.

TABLE III

| Specification Properties | Minimum | Maximum | Test Method |
| --- | --- | --- | --- |
| Gravity, API at 60/60°F | 48.0 | 51.0 | ASTM D 287 |
| Color, Saybolt | 30 | — | ASTM D 156 |
| Aniline point, °F | 185 | — | ASTM D 611 |
| Sulfur, ppm | — | 10 | ASTM D 1266 (Nephelometric mod.) |
| Distillation, °F | | | ASTM D 86 |
| IBP | 400 | 410 | |
| Dry point | — | 495 | |
| Flash point, °F (Pensky-Martens closed cup) | 160 | — | ASTM D 93 |

The amount of oil used in relation to the water to prepare the emulsion may be varied over wide ranges. As a general rule, the amount of oil-to-water may vary between 5:1–1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil soluble emulsifying agent. The amount of emulsifying agent to provide an emulsion will have to be determined by routine experimentation. As a general rule it may be said that the amount of oil soluble emulsifier may range from 0.1 to 30 percent by weight based on the weight of the oil. To produce stable emulsions the amount of emulsifier will normally be within the range of 12–20 percent by weight of the oil.

Rather than provide a listing of suitable emulsifiers, recommended as being satisfactory are the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

PREPARATION OF THE STABLE LIQUID DISPERSIONS

Once latices containing the water soluble anionic vinyl addition polymers are prepared the water soluble cationic polymers are combined therewith by the utilization of conventional mixing techniques. Preferably the water soluble cationic polymers are in the form of aqueous solutions which contain 5 - 40 % by weight of the polymer and are added to the polymeric latex. Alternatively, they may be nearly water-free. After uniformly mixing the two components there results a stable liquid dispersion of a water soluble anionic vinyl addition polymer and a water soluble cationic polymer. The proportions of the two polymers may be varied to a considerable degree. For instance, the ratio of the water soluble anionic vinyl addition polymer to water soluble cationic polymer may vary between 1:10–10:1 on a weight basis. A preferred ratio is 1:5 to 5:1. The most preferred ratio is 1:2–2:1.

The amount of the water soluble vinyl addition polymers plus the water soluble cationic polymers present in the finished liquid dispersion may be varied over a wide range of concentrations, e.g. dispersions containing from 5 to 75 percent by weight are useful, although for most applications the total weight of the two polymers contained in the dispersion will be within the range of 5 – 40 percent by weight, with a very beneficial dispersion being one which contains between 10–30 percent by weight of the two polymers.

The finished dispersions are stable at room temperature for periods of time ranging between several days to as long as six months since they may be prepared over a wide variety of concentrations. Concentrates containing large amounts of polymers may be prepared and shipped to a use point and then diluted with an organic liquid just prior to use.

PREPARATION OF THE LIQUID DISPERSIONS

To illustrate the preparation of liquid dispersions a variety of emulsions were prepared containing different water soluble anionic vinyl addition polymers. These emulsions are set forth below in TABLE IV.

TABLE IV

| COMPOSITION NUMBER | WATER (% by Weight) | OIL (% by Weight) | POLYMER | % In EMULSION | POLYMER PARTICLE Size Range |
|---|---|---|---|---|---|
| I | 72 | 28 (I) | 93% acrylamide 7% methacrylic acid | 35 | 0.05–7.0 microns |
| II | 72 | 28 (I) | 93% acrylamide 7% methacrylic acid | 35 | 0.05–7.0 microns |
| III | 72 | 28 (T) | 70% acrylamide 30% acrylic acid | 35 | 0.05–7.0 microns |
| IV | 67 | 33 (I) | 93% acrylamide 7% methacrylic acid | 32 | < 30 microns |
| V | 70 | 30 (I) | 70% acrylamide 30% acrylic acid | 34 | .01–10 microns |
| VI | 71 | 29 (I) | Sodium Polyacrylate | 37 | < 1 mm. |

I = Isopar,
T = Toluene

DISPERSION A

To emulsion in TABLE IV, COMPOSITION NUMBER VI, there was added 30 percent by weight of an aqueous dispersion containing 23 percent by weight of an alkylene polyamine prepared from the condensation of ethylene dichloride and ammonia. The polymer was prepared using the techniques set forth in Canadian Pat. No. 785,829.

DISPERSION B

To COMPOSITION NUMBER VI in TABLE IV there was added an aqueous dispersion which contained 25 percent by weight of an ammonia ethylene dichloride polymer of the type used in DISPERSION A above with the exception it had been quaternized with methyl chloride.

To illustrate other dispersions TABLE V is presented below:

TABLE V

| ANIONIC LATEX TABLE IV | % by Weight | CATIONIC POLYMER | % by Weight |
|---|---|---|---|
| I | 60 | 20% Solution of a tetraethylene pentamine epichlorohydrin reaction product (Canadian Pat. 731,212) | 40 |
| VI | 50 | Ethylene diamine | 10 |
| V | 70 | 75% acrylamide, 25% dimethylamino ethyl methacrylate copolymer in the form of a latex (water-in-oil - see TABLE II, U.S. 3,624,019) | 30 |

All of the above dispersions were stable and were capable of being stored under a variety of conditions without inter-reaction of the two polymers.

INVERSIONS OF THE STABLE LIQUID DISPERSIONS

One of the most interesting phenomenon that occurs in working with the above described stable liquid dispersions is the fact that under certain conditions the emulsion which contains dispersed therein the finely-divided water soluble anionic vinyl addition polymers may be inverted.

The water soluble anionic vinyl addition polymer-containing emulsions may be inverted by any number of means. The most convenient resides in the use of a surfactant added to either the polymer-containing emulsion or to the water into which it is to be dispersed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on polymer. Good inversion often occurs within the range of 1.0–10 percent based on polymer.

The preferred surfactants are hydrophylic and are further characterized as being water soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as the surfactant.

In addition to using the water soluble surfactants described above, other surfactants may be used such as silicones, clays and the like which are included as surfactants since, in certain instances, they tend to invert the emulsion even though they are not water soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

The dispersions may be inverted by treating them with aqueous solutions of alkaline materials such as solutions of sodium hydroxide, ammonia, amines, sodium aluminate or the like.

Other techniques for inverting the dispersions include the use of agitation, heat and pH shift, as well as the placement into the water, into which the polymer-containing emulsion is to be dissolved, certain electrolytes. For any particular polymer-containing emulsion a suitable method for its inversion may be readily determined by routine experimentation.

While many of the above methods may be used to invert the stable liquid dispersion, it is preferred that surfactant solutions having concentrations within the ranges described be first injected into the well to place the surfactant into the well hole. After placement of the surfactant solution into the well hole the stable liquid dispersion is then injected into the well where it inverts to produce a rigid water and hydrocarbon liquid insoluble three-dimensional structure which is capable of sealing off the well which deprives the fire of a source of fuel, thereby extinguishing the fire. Most of the solid gel-like structures are flexible and upon formation conform exactly to the contours of the well hole. This enables a good seal to be produced, which is both liquid and gas tight even at conditions of high pressure and/or high velocity liquid or gaseous flow.

EXAMPLE

To illustrate how the invention is used to combat oil or gas well fires the following is presented:

To a burning oil well there is first drilled a lateral cased hole which connects in the area near the bottom of the hole. Into this hole would be pumped 1,000 gallons of a 5 percent solution of a dodecyl benzene sodium sulfonate. Upon completion of this addition 5,000 gallons of crude oil which contain 30 percent by weight of DISPERSION A would be pumped so that it entered the bottom area of the region adjacent to the bottom hole of the burning well. Within an hour after all of the solution had been pumped the fire would be extinguished.

Having thus described my invention, I claim:

1. A method for extinguishing oil and gas well fires which comprises injecting into said well at a point below the fire a stable liquid dispersion of a water soluble anionic vinyl addition polymer and a water soluble cationic polymer comprising:
   A. a polymeric latex composed of a water-in-oil emulsion which contains dispersed therein a finely-divided water soluble anionic vinyl addition polymer, said polymeric latex having uniformly distributed therethroughout;
   B. a water soluble cationic polymer:
   with the weight ratio of (A) to (B) being within the range of 1:10 to 10:1 and the total amount of (A) plus (B) present within said dispersion being within the range of from 5 to 75 percent by weight, and then inverting the liquid dispersion in the well to produce a three-dimensional water and hydrocarbon liquid insoluble gel-like structure which seals off said well; thereby extinguishing said fires.

2. The method of claim 1 where the weight ratio of (A) to (B) is within the range of from 1:5 to 5:1 and the amount of (A) plus (B) present within said dispersion is within the range of from 5 to 40 percent by weight.

3. The method of claim 1 wherein the inversion is accomplished by admixing the stable liquid dispersion with water which contains 0.01 to 5 percent by weight of a water soluble surfactant or a water soluble caustic material.

4. The method of claim 1 wherein the inversion is accomplished by first injecting into said well prior to the injection of the stable liquid dispersion an aqueous liquid which contains 0.1 to 5 percent by weight of a water soluble surfactant or a water soluble caustic material.

5. The method of claim 3 wherein:
   A. a polymeric latex composed of a water-in-oil emulsion which contains dispersed therein a finely-divided polyacrylic acid or a water soluble salt thereof, said polymeric latex having uniformly distributed therethroughout;
   B. a water soluble alkylene polyamine polymer.

6. The method of claim 4 wherein:
   A. a polymeric latex composed of a water-in-oil emulsion which contains dispersed therein a finely-divided polyacrylic acid or a water soluble salt thereof, said polymeric latex having uniformly distributed therethroughout;
   B. a water soluble alkylene polyamine polymer.

* * * * *